June 28, 1966 H. N. OPPENHEIMER 3,258,528

CONVERTER FOR CHANGING A BLACK AND WHITE TELEVISION SIGNAL TO A COLOR TELEVISION SIGNAL

Filed June 18, 1963

INVENTOR.
HENRY N. OPPENHEIMER

BY H. A. Mackey

ATTORNEY.

3,258,528

CONVERTER FOR CHANGING A BLACK AND WHITE TELEVISION SIGNAL TO A COLOR TELEVISION SIGNAL

Henry N. Oppenheimer, New York, N.Y., assignor to General Precision, Inc., a corporation of Delaware Filed June 18, 1963, Ser. No. 288,737
4 Claims. (Cl. 178—5.4)

Figure 1:
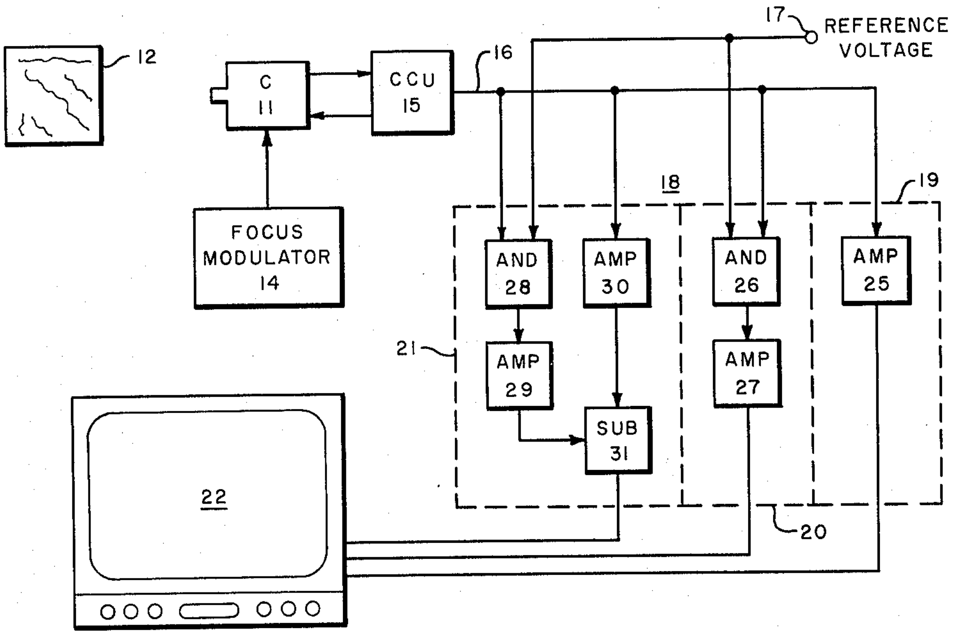

This invention relates to television signal generators and more particularly to a converter system for changing a conventional black and white television signal to a color television signal suitable for reproduction on a conventional multi-gun colored television receiver or monitor.

An ever increasing use is being made of closed circuit and broadcast television to convey and display a wide variety of information. Most of the installations to date and those contemplated in the immediate future have or will employ black and white systems. The black and white systems are less costly and require far less maintenance than currently available color systems. However, a black and white system decreases the usefulness of the medium for displaying alphanumeric, symbolic, tabular and graphic information as well as a wide variety of other types of information since it is difficult to emphasize certain selected items or portions thereof.

With the use of color, specific items may be emphasized so that they stand out and are readily distinguished from the remaining information.

One object of this invention is to provide a system which provides reproduction in color of a conventional black and white television signal on a conventional multi-gun colored television receiver or monitor.

Another object of the invention is to provide a system for converting a standard black and white television signal to a color television signal for full color reproduction according to a preselected gray scale to specific color conversion.

The subject invention contemplates a conversion system for converting a standard black and white color television signal to a standard color television signal suitable for providing a color image in conjunction with a standard multi-gun color television receiver or monitor.

The foregoing and other objects and advantages of the invention will become more apparent from a consideration of the specification and drawings wherein one embodiment of the invention is described and shown in detail for illustration purposes only.

Figure 2:
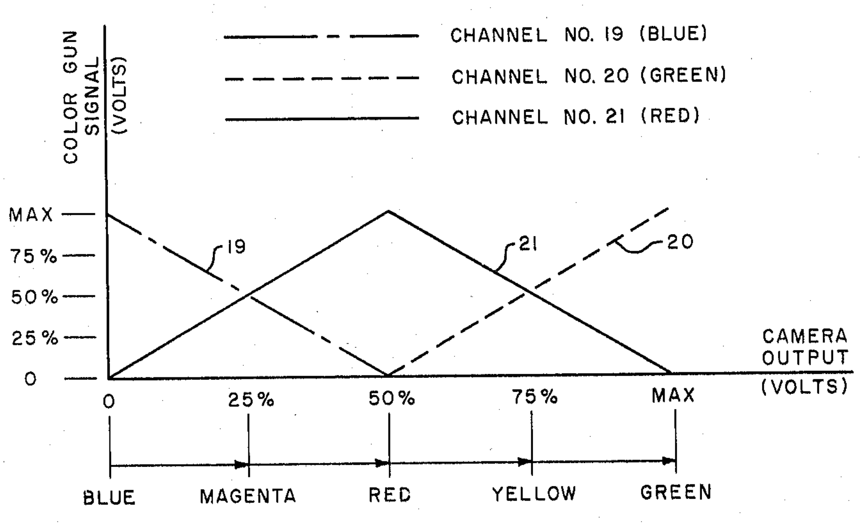

In the drawings:

FIGURE 1 is a block diagram of a television distribution and reproduction system utilizing a novel black and white to color television conversion system constructed in accordance with the invention; and, FIGURE 2 is a graph illustrating the operation of the novel converter shown in FIGURE 1.

In FIGURE 1 a conventional black and white television camera 11 is arranged to view an area 12. A focus modulator circuit 14 of conventional design is connected to camera 11 to provide uniform or flat camera response over the entire area. Thus the same gray scale located at any point in area 12 will provide an identical output at camera 11. A conventional camera control unit 15 provides horizontal and vertical sweep voltages for camera 11, as well as amplification of the camera video output.

Camera control unit 15 provides the black and white television signal on an output conductor 16. This signal will vary typically between 0 and 1 volt depending upon the instantaneous gray scale of the area 12 being scanned by camera 11. That is, as area 12 goes from black to white the output voltage on conductor 16 will go from 0 to 1 volt or from 0 to maximum. A reference voltage which is equal to one-half the maximum voltage swing of conductor 16 is applied to a terminal 17 and in conjunction with the signal on conductor 16 provides the two inputs to the novel conversion system 18.

Conversion system 18 is divided into three channels 19, 20 and 21, each of which is connected to and energizes one of the three guns included within a standard multi-gun color television receiver or monitor 22. FIGURE 2 illustrates graphically the outputs of channels 19, 20 and 21 as functions of the camera output which is set forth in percentages of the maximum output. The output of each channel is designated by a differently marked line.

Channel 19 includes a linear inverting amplifier 25 which provides, as shown in FIGURE 2, a maximum voltage, approximately 1 volt, when the camera output is zero. The output of amplifier 25 falls to zero as the camera output increases from zero output to 50% of maximum output and remains at zero for all higher outputs of the camera. In order to produce the specific color scale set forth in FIGURE 2 the output of amplifier 25 is connected to the blue gun in the receiver 22. Any other color vs. camera output spectrum may be obtained by changing the connectiton of the color guns.

Channel 20 has a two input AND circuit 26 with one input connected to terminal 17 and the other connected to conductor 16. Thus, it provides an output which follows that on conductor 16 only when the output on conductor 16 equals or exceeds the reference voltage. The output of AND circuit 26 is applied to a non-inverting linear amplifier 27, the output of which is shown graphically in FIGURE 2 as a function of the camera output as seen on conductor 16. The output rises from zero to a maximum as the output on conductor 16 rises from its half level to maximum. This output is applied to the green gun in receiver 22. Here again the particular color gun to which the output is applied is a matter of choice and different combinations will produce different color renditions of the same black and white picture.

Channel 21 has an AND circuit 28 and an amplifier 29 which are identical in every respect to AND circuit 26 and amplifier 27 previously described. In addition a linear non-inverting amplifier 30 is connected to conductor 16 and provides an output which is the reverse of that provided by amplifier 25. Amplifiers 25 and 30 are designed to saturate at one-half the maximum black and white television signal voltage while amplifiers 27 and 29 saturate at the maximum signal voltage, which in most instances will be at one volt. Thus, when the outputs of amplifiers 29 and 30 are applied to subtracting circuit 31, the output illustrated in solid line in FIGURE 2 is derived. This output rises from zero volt to a one volt maximum as the output on conductor 16 increases from zero to 50% of its maximum and decreases from one volt to zero as the output on conductor 16 continues to increase from the 50% of maximum level to maximum. The output of circuit 31 is applied to the red gun of receiver 22.

FIGURE 2 in addition illustrates the various colors obtained on the receiver viewing surface as the camera output increases from zero to maximum. If maximum is one volt; blue is produced at zero output; at quarter volt, magenta; at half volt, red; at three-quarter volt, yellow; and at one volt, green. As previously stated the outputs of the different channels may be connected to different guns and the color spectra will also change.

With the arrangement described white areas will be reproduced as green on the screen while black areas will be reproduced as blue. Those areas falling in between on the gray scale will vary between green and blue according to the spectrum graphically illustrated in FIGURE 2. It is thus possible to emphasize any portion of a map or chart by selecting for example the gray scale for that portion which corresponds to red in the reproduction. Other colors may be chosen by selecting the appropriate gray scale for their reproduction.

While only one embodiment of the invention has been illustrated and described in detail, it is to be expressly understood that the invention is not limited thereto. Various changes may also be made in the design and arrangement of the parts without departing from the spirit and the scope of the invention as the same will now be understood by those skilled in the art.

What is claimed is:

1. A converter for accepting a black and white television signal and for providing three unique television signals suitable for use in a multi-gun color television reproducer to provide a color rendition of the black and white television signal comprising, first circuit means responsive to the black and white video signal for providing a first output which varies linearly from a first value to a second value as the black and white video signal varies linearly from a first gray scale level to a second gray scale level, second circuit means responsive to the black and white video signal for providing an output which varies linearly from said second value to said first value as the black and white video signal varies linearly from said second gray scale level to a third gray scale level, third circuit means responsive to the black and white video signal for providing an output which varies linearly from said second value to said first value as said black and white video signal varies linearly from said first gray scale level to said second gray scale level and varies linearly from said first value to said second value as said black and white video signal varies linearly from said second gray scale level to said third gray scale level, and means for connecting the first, second and third circuit means outputs each to a predetermined different color gun of a multi-gun television reproducer whereby a color rendition of the black and white television signal may be reproduced on the screen of said reproducer.

2. A converter as set forth in claim 1 in which said first circuit means comprises an inverting amplifier which saturates at the half maximum value of the black and white video signal, said second circuit means comprising an AND circuit connected to the fixed reference voltage from the first means and the black and white video signal for passing that portion of the video signal which exceeds the fixed reference voltage and a non-inverting linear amplifier connected to the AND circuit output for amplifying that output, said amplifier saturating at the maximum signal voltage of the black and white video signal, and said third circuit means comprising an AND circuit connected to the fixed reference voltage and the black and white video signal for passing that portion of the video signal which exceeds the reference voltage, a first non-inverting linear amplifier connected to the output and the AND circuit, a second non-inverting linear amplifier connected to the black and white video signal, said second amplifier saturating at one-half the maximum value of the black and white video signal, and circuit means for subtracting the outputs of the first and second amplifiers.

3. A converter for accepting a single black and white television signal for providing three unique television signals suitable for use in a multi-gun color television reproduced to provide a color rendition of the black and white television signal comprising, first circuit means responsive to the black and white video signal for providing an output which varies linearly from a maximum value to zero as the said black and white video signal varies linearly from zero to one-half its maximum value, second circuit means responsive to the black and white video signal for providing an output which varies linearly from zero to a maximum value as the said black and white video signal varies linearly from its half maximum value to its maximum value, third circuit means responsive to the black and white video signal for providing an output which varies linearly from zero to a maximum value as the said black and white video signal varies linearly from zero to one-half its maximum value and varies linearly from a maximum value to zero as the said black and white video signal varies from its half maximum value to its maximum value, and means for connecting the first, second and third circuit means outputs each to a predetermined different color gun of a multi-gun television reproducer whereby a color rendition of the black and white television signal may be reproduced on the screen of the said reproducer.

4. A converter for accepting a single black and white television signal and providing three separate unique television signals suitable for use in a multi-gun color television reproducer to provide a color rendition of the black and white television signal comprising, first means for supplying a fixed reference voltage having a value equal to one-half the maximum attainable voltage of the black and white signal voltage which is to be converted, first circuit means responsive to the black and white video signal to be converted for providing an output which varies linearly from a maximum value to zero as the said black and white video signal varies linearly from zero to one-half its maximum value, said first circuit means output remaining at zero for any other video signal value, second circuit means responsive to the black and white video signal and the fixed reference voltage for providing an output which varies linearly from zero to a maximum value as the said black and white video signal varies linearly from its half maximum value to its maximum value, said second circuit means remaining at zero for any other video signal value, third circuit means responsive to the black and white video signal and the fixed reference voltage for providing an output which varies linearly from zero to a maximum value as the black and white video signal varies linearly from zero to one-half its maximum value and varies linearly from a maximum value to zero as the black and white video signal varies from its half maximum value to its maximum value, and means for connecting the first, second and third circuit means outputs each to a predetermined different color gun of a multi-gun color television reproducer whereby a color rendition of the black and white television signal may be reproduced on the screen of the reproducer.

References Cited by the Examiner

UNITED STATES PATENTS

| | | | |
|---|---|---|---|
| 2,874,212 | 2/1959 | Bechley | 178—5.4 |
| 3,078,340 | 2/1963 | Willey | 178—6.5 |
| 3,193,838 | 7/1965 | Mitchell | 178—5.4 |

DAVID G. REDINBAUGH, *Primary Examiner.*

J. A. O'BRIEN, *Assistant Examiner.*